March 24, 1925.

S. A. KOST ET AL 1,531,010

SHOCK ABSORBER

Filed April 24, 1923

Inventors
Stephen A. Kost
Albert J. Daniel

Patented Mar. 24, 1925.

1,531,010

UNITED STATES PATENT OFFICE.

STEPHEN A. KOST AND ALBERT L. DANIEL, OF BUFFALO, NEW YORK, ASSIGNORS TO WESTERN IMPLEMENT COMPANY, OF PORT WASHINGTON, WISCONSIN.

SHOCK ABSORBER.

Application filed April 24, 1923. Serial No. 634,247.

*To all whom it may concern:*

Be it known that we, STEPHEN A. KOST and ALBERT L. DANIEL, both citizens of the United States, and residents of Buffalo, in the county of Erie and State of New York, have invented certain new and useful Improvements in Shock Absorbers; and we do hereby declare that the following is a full, clear, and exact description thereof.

This invention relates to shock absorbers and is particularly directed to shock absorbers for vehicles.

Objects of this invention are to provide a shock absorber which will aid the main springs of an automobile in checking an excessive downward motion of the body and which will check a rebound or sudden upward motion, thereby effectively cushioning the body, which will quickly damp out periodic or sustained vibration, and which will cushion all the relatively small rapid tremors which the chassis or running gear is subjected to and prevent their communication to the body.

Further objects are to provide a shock absorber which may be readily applied to existing types of automobiles, which utilizes the major portion of the attaching means found upon standard equipment, which prevents excessive side or lateral swaying of the body, and which is efficient and reliable in operation.

Further objects are to provide a shock absorber which is compact and attractive in design, which harmonizes in general appearance with the spring suspension construction, which is of sturdy and simple construction, and which may be readily and cheaply produced.

Embodiments of the invention are shown in the accompanying drawings, in which.

Figure 1:
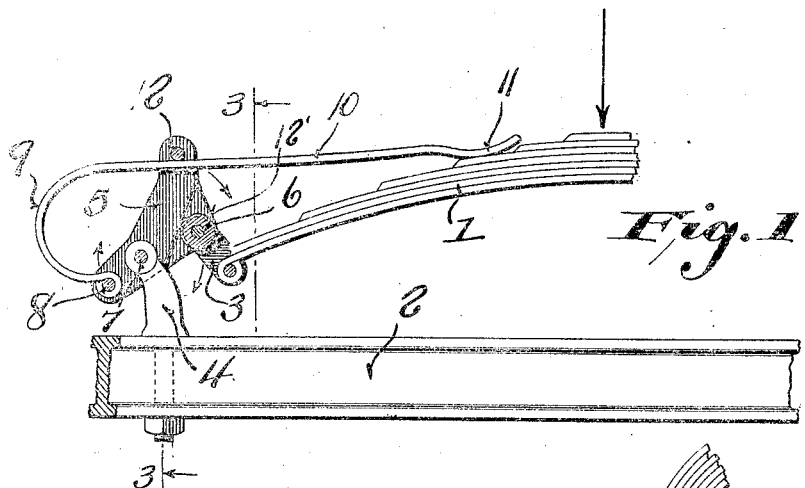
Figure 1 is a fragmentary view of the front portion of the running gear, or chassis of an automobile with the shock absorber in position and in section.

Figure 1 shows the main spring 1 and the front axle 2 which are normally connected by means of a link 3 and bracket 4. However, in the practice of this invention, the link 3 is detached from the bracket 4 and the bracket is turned so that its upper end points outwardly. A triangular member 5 is pivoted to the bracket 4 at a point intermediate two of its apexes. At one of its apexes it is joined by means of a pivot pin 6 with the link 3 and adjacent the apex upon the opposite side of the pivot pin 7 of the bracket 4 it is pivotally joined to an auxiliary spring by means of the pin 8. This auxiliary spring has a bowed portion 9 and is extended inwardly to provide an inwardly projecting arm 10 terminating in a rounded portion 11 adapted to contact with the upper portion of the main spring 1, as is clearly shown in Figure 1. A projection or pin 12 is located adjacent the remaining apex of the pivotally mounted member 5 and bears upon an intermediate portion of the arm 10 of the auxiliary leaf spring.

Figure 3:
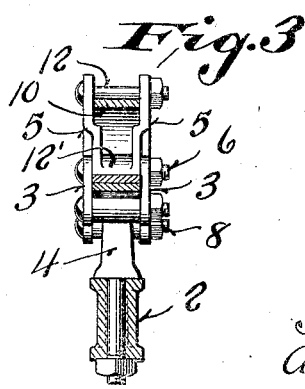
Figure 3 is a sectional view on the line 3—3 of Figure 1.

As may be seen from Figure 3 the member 5 comprises two similar plates, which are integrally joined by means of a hollow integral spacer, or hub 12'. The side plates of the member 5 are inwardly depressed adjacent this spacer and the links 3 are located upon opposite sides of such member and within the depressed portion. The upper portion of the bracket 4 is received between the side plates of the member 5 and the spring 10 is similarly located between such side plates.

Figure 2:
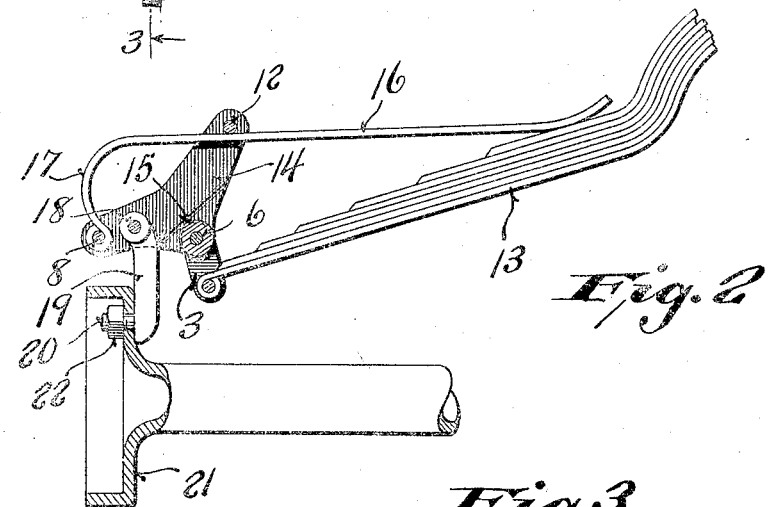
Figure 2 is a corresponding view of the shock absorber as it appears when applied to the rear axle.

As shown in Figure 2 the shock absorber is equally well adapted for attachment to the rear main springs 13. This shock absorber is in all essential respects similar to that shown in Figure 1 and comprises side plates 14 and integral spacer 15 and the pivot pins, or projections 6, 8 and 12 to which the links 3 and the auxiliary leaf spring 16 are secured in a manner identical with that disclosed in Figure 1. If desired, the spring 16 may have a shorter bowed portion, as indicated at 17 than that indicated at 9 in Figure 1.

This shock absorber is pivotally joined by means of the pin 18 to a bracket 19, which is provided with an outwardly projecting screw threaded pin 20 adapted to be passed through an aperture customarily provided in the housing 21 and is adapted to be held in place by means of a nut 22.

Both forms of shock absorbers operate in identically the same manner and, therefore, a description of the operation of one, such as illustrated in Figure 1, will suffice. When a load is placed upon the spring 10, for example, by a sudden upward motion of the running gear, the main spring pulls downwardly upon the link 3 with an increased force, thereby locking the member 5 about the pivot pin 7 and causing the outer portion 11 of the leaf spring to bear with greater force upon the upper side of the main spring at a point removed from the extremity of such main spring. This causes, therefore, an increase in the resisting force offered by the main spring and, consequently, tends to retard sudden flexing of the main spring.

Upon rebound the main spring takes a greater curvature and, consequently, presses the arm 10 upwardly. It will be seen, therefore, that the arm 10 of the auxiliary spring is pressed downwardly against the relaxing main spring and tends, therefore, to check the upward rebound.

It is to be noted that tremors or sudden vibrations of the running gear, or chassis, will not be transmitted to the main spring and from thence to the body of the automobile, for the reason that the pivotally mounted members of the shock absorbers will rock and cause the relatively lighter auxiliary springs to take up these repeated motions.

It is to be noted that the tendency of the shock absorber is to damp out periodic, or recurring oscillations of the body portions of the automobile with reference to the running gear, for the reason that the restoring force of the entire system does not uniformly vary for deflections in opposite directions from a neutral position. In other words, an aperiodic system is provided.

It is further to be noted that a very minor change is necessitated when adapting the usual type of automobile to these shock absorbers. In the form shown in Figure 1 it is merely necessary to disconnect the link 3 from the standard bracket 4 and turn the bracket outwardly. In the form shown in Figure 2, the usual bracket is dispensed with and the bracket 19 substituted therefor. These changes are very easily made and, therefore, the shock absorbers may be most easily and readily applied to existing types of automobiles.

It is further to be noted that the shock absorbers tend to prevent excessive side, or lateral swinging of the body of the automobile with reference to the running gear, for when such side swinging occurs, the members 5 or 14 are rocked about their pivot points and the springs 10 or 16 are compressed in a manner to resist this motion.

It will be seen, therefore, that an extremely simple and efficient shock absorber has been provided for automobiles and one which may be cheaply manufactured and easily applied, Although the invention has been described in considerable detail, it is to be understood that the principle thereof may be followed in different forms from those shown in the drawings and the invention, therefore, is not to be limited, except as defined in the appended claims.

We claim:

1. In an automobile the combination of a running gear, a bracket carried thereby, a substantially triangular member pivotally joined to said bracket at a point intermediate two of its apexes, a main spring operatively joined to said triangular member adjacent one of its apexes on one side of the pivot point, an auxiliary leaf spring pivotally joined to said member adjacent another apex on the opposite side of the pivot point and curving over and bearing at its free end against said main spring, and a projecting member carried by said triangular member adjacent its third apex and bearing upon an intermediate portion of said auxiliary spring.

2. In an automobile, the combination of a running gear, a bracket carried thereby, a triangular rocking member pivoted to said bracket along one side between an inner and an outer apex and having its third apex normally projecting upwardly and inwardly with relation to said pivot point, a main spring pivotally joined to said inner apex, an auxiliary spring pivoted to said outer apex and curving outwardly and extending to the upper side of said main spring, and a projection carried adjacent the uppermost apex and bearing against the upper side only of said auxiliary spring, whereby when said main spring is depressed, said triangular member is rocked and said auxiliary spring pivots about the outer apex of said triangular member and is depressed intermediate its ends by said projection.

3. In an automobile, the combination of a running gear, a member comprising a pair of spaced plates with a spacer between said plates and integrally joined thereto, a bracket carried by said running gear and located between and pivoted to said plates, a main spring, a pair of links pivotally connecting said main spring and said member and located upon the outer sides of said member adjacent said spacer, a pair of pins carried by said member and passing through said plates, and an auxiliary spring pivoted to one of said pins and bowed outwardly and having an elongated portion passing beneath the other pin and bearing at its end against said main spring.

In testimony that we claim the foregoing we have hereunto set our hands at Buffalo, in the county of Erie and State of New York.

STEPHEN A. KOST.
ALBERT L. DANIEL.